United States Patent
Qian et al.

(10) Patent No.: US 6,542,632 B1
(45) Date of Patent: Apr. 1, 2003

(54) METHOD FOR IMAGE CHARACTERIZATION USING COLOR AND TEXTURE STATISTICS WITH EMBEDDED SPATIAL INFORMATION

(75) Inventors: Richard Qian, Vancouver, WA (US); Peter J. L. Van Beek, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/264,248

(22) Filed: Mar. 8, 1999

Related U.S. Application Data

(60) Provisional application No. 60/118,212, filed on Feb. 1, 1999.

(51) Int. Cl.[7] .................................................. G06K 9/00
(52) U.S. Cl. ........................ 382/165; 382/305; 382/299; 707/104.1
(58) Field of Search ................................ 382/162–167, 382/305, 299; 707/2–6, 102–104

(56) References Cited

U.S. PATENT DOCUMENTS

| | | | |
|---|---|---|---|
| 4,979,225 A | 12/1990 | Tsujiuchi et al. | |
| 5,309,228 A | 5/1994 | Nakamura | |
| 5,446,543 A | 8/1995 | Nakagawa et al. | |
| 5,446,709 A | 8/1995 | Mukai | |
| 5,509,111 A | 4/1996 | Hong et al. | |
| 5,521,841 A | 5/1996 | Arman et al. | |
| 5,579,471 A | 11/1996 | Barber et al. | |
| 5,586,197 A | 12/1996 | Tsujumura | |
| 5,606,655 A | 2/1997 | Arman et al. | |
| 5,652,881 A | 7/1997 | Takahashi | |
| 5,875,265 A | * 2/1999 | Kasao | 382/229 |
| 5,963,670 A | * 10/1999 | Lipson et al. | 382/224 |
| 6,115,717 A | * 9/2000 | Mehrotra et al. | 707/102 |
| 6,134,541 A | * 10/2000 | Castelli et al. | 707/2 |

OTHER PUBLICATIONS

Chua et al. "Fast signature–based color–spatial image retrieval" Proc. International Conference on Multimedia computing and Systems 1997 pp. 363–369, Jun. 1997.*

Hsu et al. "An integrated color–spatial approach to content–based image retrieval" Proc. of the third ACM international conference on Multimedia, pp. 305–313, Nov. 1995.*

Region Based Image Querying; University of California at Berkely; 1997, pp. 1–8.

IEEE Transactions on Pattern Anaylsis and Machine Intelligence; vol. 17, No. 7, Jul. 1995; pp. 729–736.

Local Color and Texture Extraction and Spatial Query; Dept. of Electrical Engineering, Columbia University, 1996; pp. 1011–1014.

Tools and Techniques for Color Image Retrieval System; Columbia University; 1/96; pp. 426–437.

Efficient Color Histogram Indexing; IBM Almaden Research Center; 1994 pp. 66–70.

Querying by Color Regions using the VisualSEEk Content–Based Visual Query System; Columbia University; 1996; pp. 1–19.

Image Indexing Using Color Corelograms; Cornell University; 1997; pp. 762–769.

Content–Based Image Retrieval Using Color Tuple–Histograms; Brunel University, Middlesex, UK; 1/96; pp. 2–7.

(List continued on next page.)

*Primary Examiner*—Jingge Wu
(74) *Attorney, Agent, or Firm*—Chernoff, Vilhauer, McClung & Stenzel, LLP

(57) ABSTRACT

A method for characterizing an image where a number of test areas of predefined shape and size are located on the image. The color or the texture of the image over each of the test areas is quantified. The image can be characterized by statistical descriptions of the frequency distribution of color or texture of the test areas.

8 Claims, 7 Drawing Sheets

| | 0% TO 10% | 10% TO 20% | 20% TO 30% | 30% TO 40% | 40% TO 50% | 50% TO 60% | 60% TO 70% | 70% TO 80% | 80% TO 90% | 90% TO 100% |
|---|---|---|---|---|---|---|---|---|---|---|
| $\mu_0$ | 0 | 0 | 0 | 1 | 0 | 0 | 0 | 0 | 0 | 0 |
| $\mu_1$ | 1 | 0 | 0 | 0 | 0 | 4 | 0 | 0 | 1 | 2 |
| $\mu_2$ | 0 | 4 | 0 | 3 | 0 | 0 | 3 | 5 | 1 | 1 |
| $\mu_3$ | 0 | 0 | 3 | 2 | 0 | 7 | 0 | 4 | 1 | 6 |
| $\mu_4$ | 0 | 2 | 0 | 0 | 4 | 0 | 0 | 0 | 0 | 5 |
| $\mu_5$ | 0 | 0 | 0 | 0 | 0 | 9 | 0 | 3 | 0 | 6 |
| $\mu_6$ | 0 | 0 | 5 | 0 | 0 | 0 | 0 | 0 | 0 | 3 |
| $\mu_7$ | 0 | 0 | 0 | 0 | 6 | 3 | 0 | 0 | 0 | 2 |
| $\mu_8$ | 0 | 4 | 0 | 0 | 1 | 0 | 0 | 0 | 2 | 0 |
| $\mu_9$ | 0 | 0 | 0 | 0 | 0 | 0 | 0 | 0 | 0 | 1 |
| $\mu_{10}$ | 2 | 0 | 1 | 0 | 5 | 0 | 2 | 0 | 4 | 0 |

OTHER PUBLICATIONS

Histogram Refinement for Content–Based Image Retrieval; Cornell University; 1996; pp. 96–102.

Navigating Through a Space of Color Images; Stanford University; 1997; 8 pages.

Color Indexing with Weak Spatial Constraints; Swiss Federal Institute of Technology, Zurich Switzerland; 1/96; pp. 29–40.

Similarity of Color Images; Swiss Federal Institute of Technology, Zurich Switzerland; 1995; pp. 381–392.

Color Indexing; International Journal of Computer Vision; 1991; pp. 11–32.

Augmented Image Histogram for Image and Video Similarity Search; Polytechnic University; Feb. 2, 1999; pp. 523–532.

* cited by examiner

|  | S = X1 | S = X2 | S = X3 |
|---|---|---|---|
| $\mu_0$ | 0 | 0 | 0 |
| $\mu_1$ | 2 | 0 | 2 |
| $\mu_2$ | 1 | 4 | 2 |
| $\mu_3$ | 6 | 3 | 0 |
| $\mu_4$ | 5 | 0 | 0 |
| $\mu_5$ | 6 | 2 | 1 |
| $\mu_6$ | 3 | 0 | 0 |
| $\mu_7$ | 2 | 3 | 2 |
| $\mu_8$ | 0 | 1 | 0 |
| $\mu_9$ | 1 | 0 | 1 |
| $\mu_{10}$ | 0 | 0 | 0 |

FIG. 7

|  | 0% TO 10% | 10% TO 20% | 20% TO 30% | 30% TO 40% | 40% TO 50% | 50% TO 60% | 60% TO 70% | 70% TO 80% | 80% TO 90% | 90% TO 100% |
|---|---|---|---|---|---|---|---|---|---|---|
| $\mu_0$ | 0 | 0 | 0 | 1 | 0 | 0 | 0 | 0 | 0 | 0 |
| $\mu_1$ | 1 | 0 | 0 | 0 | 0 | 4 | 0 | 0 | 1 | 2 |
| $\mu_2$ | 0 | 4 | 0 | 3 | 0 | 0 | 3 | 5 | 1 | 1 |
| $\mu_3$ | 0 | 0 | 3 | 2 | 0 | 7 | 0 | 4 | 1 | 6 |
| $\mu_4$ | 0 | 2 | 0 | 0 | 4 | 0 | 0 | 0 | 0 | 5 |
| $\mu_5$ | 0 | 0 | 0 | 0 | 0 | 9 | 0 | 3 | 0 | 6 |
| $\mu_6$ | 0 | 0 | 5 | 0 | 0 | 0 | 0 | 0 | 0 | 3 |
| $\mu_7$ | 0 | 0 | 0 | 0 | 6 | 3 | 0 | 0 | 0 | 2 |
| $\mu_8$ | 0 | 4 | 0 | 0 | 1 | 0 | 0 | 0 | 2 | 0 |
| $\mu_9$ | 0 | 0 | 0 | 0 | 0 | 0 | 0 | 0 | 0 | 1 |
| $\mu_{10}$ | 2 | 0 | 1 | 0 | 5 | 0 | 2 | 0 | 4 | 0 |

FIG. 8

| | 0% TO 4% | 4% TO 12% | 12% TO 26% | 26% TO 52% | 52% TO 100% |
|---|---|---|---|---|---|
| $\mu_0$ | 0.3 | 0.1 | 0.6 | 1.8 | 3.0 |
| $\mu_1$ | 1.5 | 0.3 | 0.7 | 0.9 | 0.0 |
| $\mu_2$ | 1.9 | 4.3 | 0.0 | 3.1 | 2.1 |
| $\mu_3$ | 0.0 | 0.0 | 3.9 | 2.1 | 1.7 |
| $\mu_4$ | 4.5 | 2.2 | 0.3 | 0.0 | 4.0 |
| $\mu_5$ | 0.0 | 0.1 | 0.0 | 0.0 | 0.0 |
| $\mu_6$ | 9.1 | 0.0 | 5.3 | 0.0 | 4.3 |
| $\mu_7$ | 0.0 | 10.2 | 9.3 | 6.7 | 6.1 |
| $\mu_8$ | 0.0 | 4.7 | 0.0 | 0.0 | 1.2 |
| $\mu_9$ | 0.0 | 0.0 | 0.3 | 0.1 | 0.0 |
| $\mu_{10}$ | 2.2 | 3.2 | 1.7 | 0.0 | 5.2 |

METHOD FOR IMAGE CHARACTERIZATION USING COLOR AND TEXTURE STATISTICS WITH EMBEDDED SPATIAL INFORMATION

CROSS-REFERENCE TO RELATED APPLICATIONS

This application claims the benefit of U.S. Provisional Application No. 60/118,212, filed Feb. 1, 1999.

BACKGROUND OF THE INVENTION

The present invention relates to a method for characterizing an image based on the color or textural content of the image.

Image characterization is a process for describing an image based upon the outcomes of the application of pre-selected measures to the image. Image characterization is useful in a number of applications such as digital image libraries where image content is useful as a basis for image indexing and retrieval. For image characterization to be practical and effective the outcome of the application of the measures to the image should be: (1) sufficient to distinguish between different images, (2) invariant to certain types of transformations of the image, (3) insensitive to noise, (4) easy to compute and (5) compact. Various methods of image characterization have been used and proposed with resulting image descriptors exhibiting these attributes to differing degrees.

A paper by Swain et al. entitled COLOR INDEXING describes the use of color histograms to characterize images. A color histogram of an image is obtained by calculating the frequency distribution of picture elements or pixels as a function of pixel color. Color histograms are invariant to translation or rotation of the image about the viewing axis. Color histograms can differ markedly for images with differing features. However, all spatial information about the features in the image is discarded in the creation of the color histogram. Therefore as long as two images have the same number of picture elements of each color it is not possible to distinguish between them using color histograms. This is true even if the two images contain features of completely different size or shape. For example, the total areas of the like colored (like hatched) geometric features of the two images of FIG. 1A and FIG. 1B are equal and require the same number of picture elements. The images cannot be distinguished on the basis of their color histograms even though thefeatures are clearly very different in size and number, and the images are easily distinguishable by the human eye.

Several methods have been proposed to improve different aspects of the performance of color histograms. Stricker et al. in the paper entitled SIMILARITY OF COLOR IMAGES proposed the use of color moments. Color moments are statistical measures of the shape and position of the population distribution of pixel colors. In particular the color moments include a mean, a standard deviation and a skewness. Expressing the information contained in the color histogram in terms of a color moment results in a very compact image descriptor. Funt et al. in the paper entitled COLOR CONSTANT COLOR INDEXING proposed using the ratios of color triples [the red, the green and the blue pixels (RGB)] from neighboring regions of an image to reduce the effects of intensity variations. Rubner et al. in the paper entitled NAVIGATING THROUGH A SPACE OF COLOR IMAGES proposed the use of color signatures which is a plot of clusters of similar colors in an RGB color space. Using color signatures reduces the amount of data necessary to describe an image compared to that required for a color histogram. These methods improve some aspects of the performance of the image descriptors over the color histogram. However, like the color histogram, no spatial information is preserved.

Several processes have been proposed which attempt to preserve some of the spatial information that is discarded in the construction of a color histogram. Pass et.al in the paper entitled HISTOGRAM REFINEMENT FOR CONTENT BASED IMAGE RETRIEVAL proposed refining the color histogram with color coherence vectors. In this process the coherence of the color of a picture element in relation to that of other picture elements in a contiguous region is determined. Even though the number of picture elements of each color is equal and, therefore, the color histograms are identical for two images, differences between features in the images will mean that the numbers of picture elements of each color which are color coherent will vary. Color coherence vectors do embed some spatial information in the descriptors. Unfortunately, they require at least twice as much additional storage space as a traditional histogram.

Rickman et al. in the paper entitled CONTENT-BASED IMAGE RETRIEVAL USING COLOUR TUPLE HISTOGRAMS proposed image characterization by construction of a histogram of the color hue at the vertices of randomly located triangular color tuples. Since the vertices of the triangular tuples are spaced apart, some spatial information is retained. Unfortunately, it is difficult to determine the dominant color of an image from the color tuple data. Further, the retained spatial information is difficult to interpret in a normal sense, therefore making it difficult to use the information for indexing an image database.

"Color correlograms" were proposed for image characterization by Huang et al. in the paper entitled IMAGE INDEXING USING COLOR CORRELOGRAMS. A color correlogram quantifies the probability that a pixel of a particular color will lie at a specified radial distance from a pixel of a particular color in the image. The color correlogram provides a technique of measuring color coherence at different scales or distances from a point on the image. However, it is difficult to determine the dominant color of the image from a correlogram and it is difficult to interpret the correlogram in any usual human sense.

Smith et al. in the paper entitled QUERYING BY COLOR REGIONS USING THE VISUALSEEK CONTENT-BASED VISUAL QUERY SYSTEM describes a method of image characterization using regions of color. Color data is transformed and the colors of the image are quantized and then filtered to emphasize prominent color regions. "Color set" values are extracted and a histogram is approximated by retaining those color set values above a threshold level. This method of image characterization requires image segmentation, a process that is difficult and computationally intensive. The region representation is rigid and variant to rotation or translation of images.

"Blobworld" is a method of image representation proposed by Carson et al. in the paper entitled REGION-BASED IMAGE QUERYING. In this method the image is segmented into a set of localized coherent regions of color and texture, known as "blobs." The "blobworld" representation of the image is the result of recording the location, size, and color of the segmented color blobs. This method provides considerable spatial information about the image, but the "blobworld" representation is rigid and variant to rotation or translation of images. Further, the image segmentation process is difficult and requires substantial computational resources.

What is desired, therefore, is a method for characterizing an image that embeds sufficient spatial information in the descriptors to enable distinguishing images on the basis of their content. In addition the method should also be invariant to certain types of transformations of the image, conserve computational and storage resources, be insensitive to noise, and be easy to interpret in a normal sense.

SUMMARY OF THE INVENTION

The present invention overcomes the aforementioned drawbacks of the prior art by providing a method for characterizing an image comprising the steps of defining a spatial structural element including a plurality of picture elements, delineating on the image a number of test areas corresponding to the spatial structural element, and quantifying the color or, in the alternative, the texture of the image in the delineated test areas. The data resulting from the application of the inventive method is highly invariant to rotation or translation of images, but contains sufficient embedded spatial information to permit images with features of different scale to be distinguished. Further, the application of statistical methods can result in very compact expressions of the data. Also, it is computationally simple.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 7 is an exemplary illustration of the resulting image data for a first aspect of the present invention.

FIG. 8 is an exemplary illustration of the resulting image data for a second aspect of the present invention.

DETAILED DESCRIPTION OF THE PREFERRED EMBODIMENTS

In the method of image characterization of the present invention, the color or texture is quantified for a plurality of areas of predefined size and shape. The areas are preferably located on the image according to a predefined plan. The color or textural data for these areas of the image or statistical data related thereto obtained from the application of this method are useful in describing the image and in distinguishing between images. The data obtained may be referred to as image descriptors.

Figure 1A:
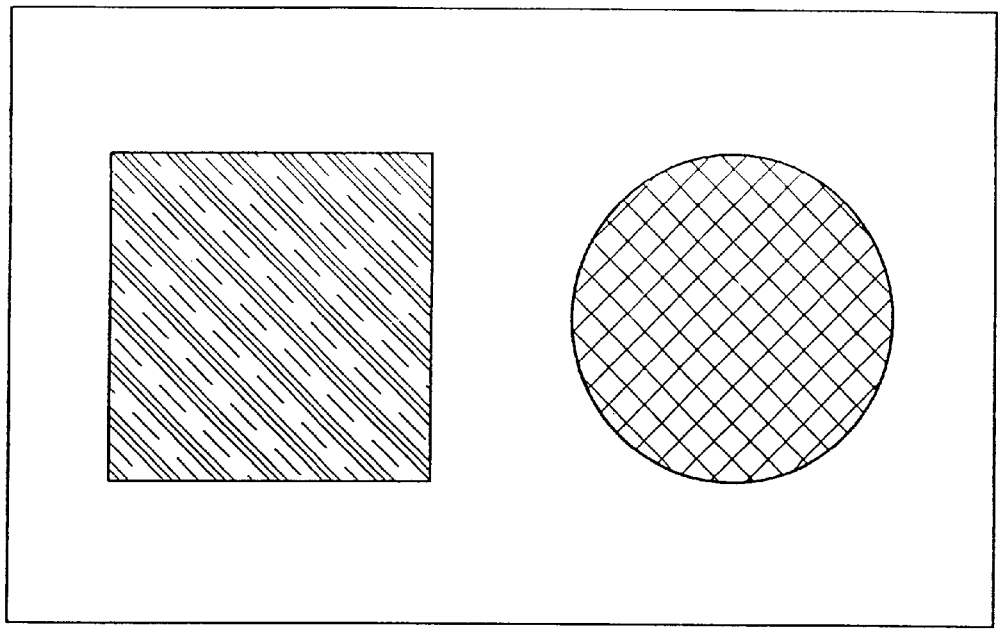
FIGS. 1A and 1B illustrate two images with features of different scale.
Figure 1B:
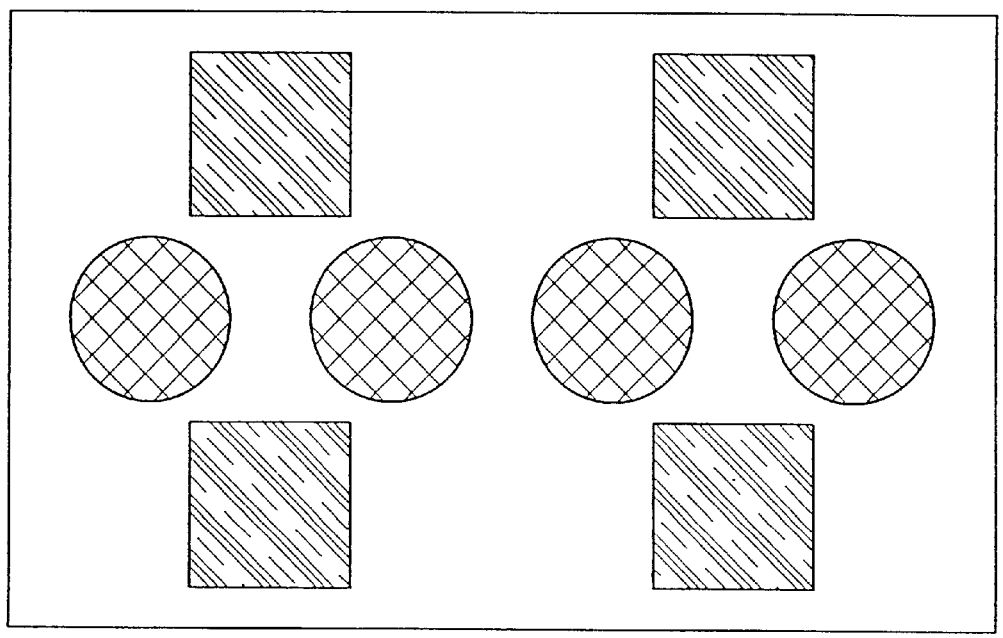
Figure 2:
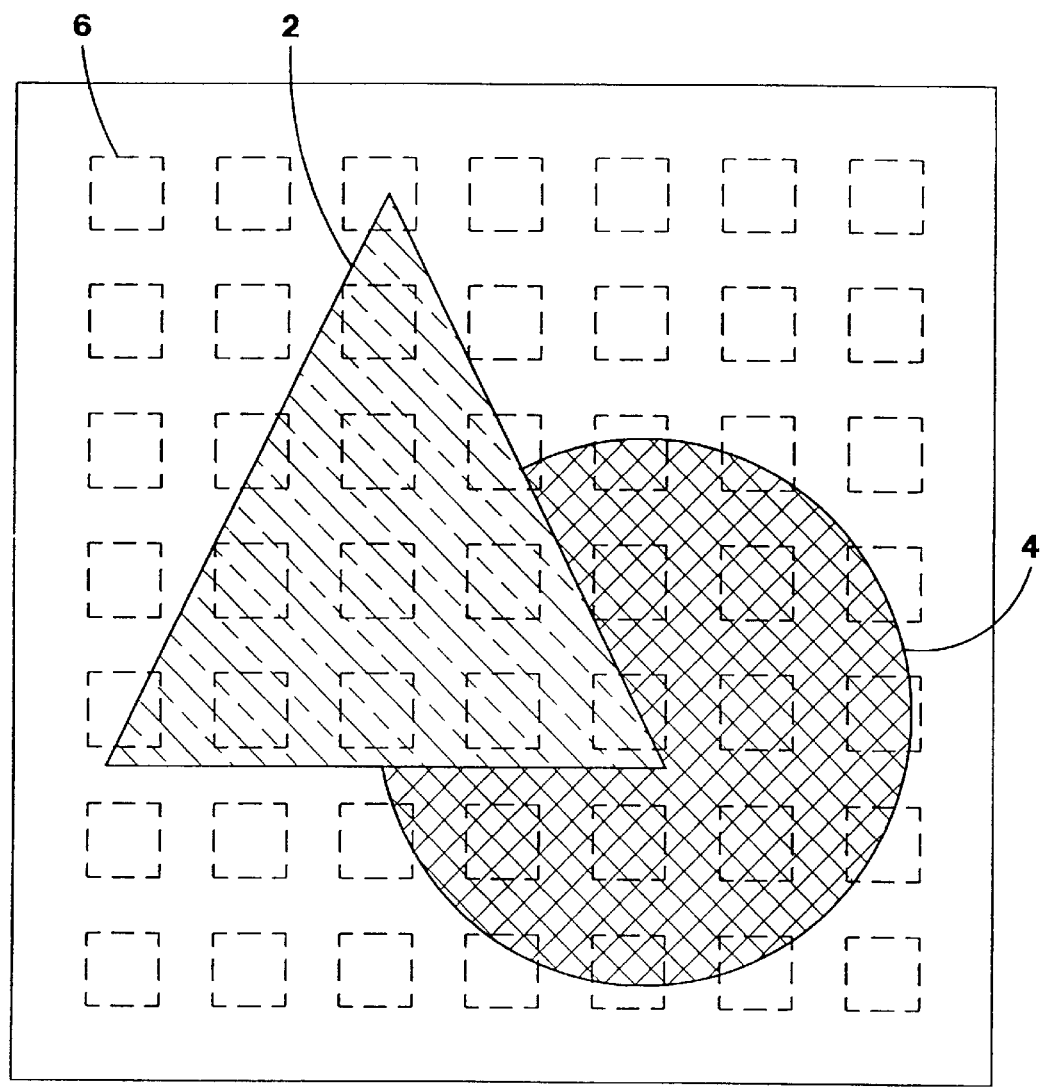
FIG. 2 illustrates an image containing features of different colors or textures with delineated test areas.

FIG. 2 illustrates the application of the method to an image having a triangular feature 2 of a first color and a circular feature 4 of a second color. The color of the remainder of the image is a third background color. A number of square test areas 6 have been delineated on the image. The size and shape of the test areas preferably correspond to the size and shape of a predefined spatial structural element encompassing a plurality of picture elements or pixels. While the spatial structural element defining the test areas illustrated in FIG. 2 is a square, there are no restrictions on the shape or size of the element. A particular shape and size for the test areas can be defined by the application utilizing the inventive method. Regular shapes such as rectangles or circles may be more convenient in many applications than an amorphous shape or "blob." Also, the test area may be a scattered pattern of picture elements or pixels, akin to a shotgun blast. Likewise, the plan for locating the test areas on the image is not restricted to the rectilinear pattern illustrated in FIG. 2 and can be defined by an application utilizing the method.

A number of the test areas 6 of FIG. 2 lie wholly within the triangular feature 2. The color of the image in these test areas is the homogenous first color. Likewise, a number of test areas lie wholly within the circular feature 4 or the background. Over these test areas the image color is homogenous and can be quantified as either the second color or the background color, respectively. To varying degrees the remaining test windows overlap two or more regions of color. The colors in these areas are not homogeneous.

Like the shape of the test areas and the plan for locating test areas, the size of the test area is determined in the application. However, spatial information about the image is embedded in the data or image descriptors because the test areas have scale, that is, the areas encompass a plurality of picture elements. As can be seen by comparing FIGS. 2 and 3 changing the scale of the test area changes the number of test areas of each color.

Figure 4:
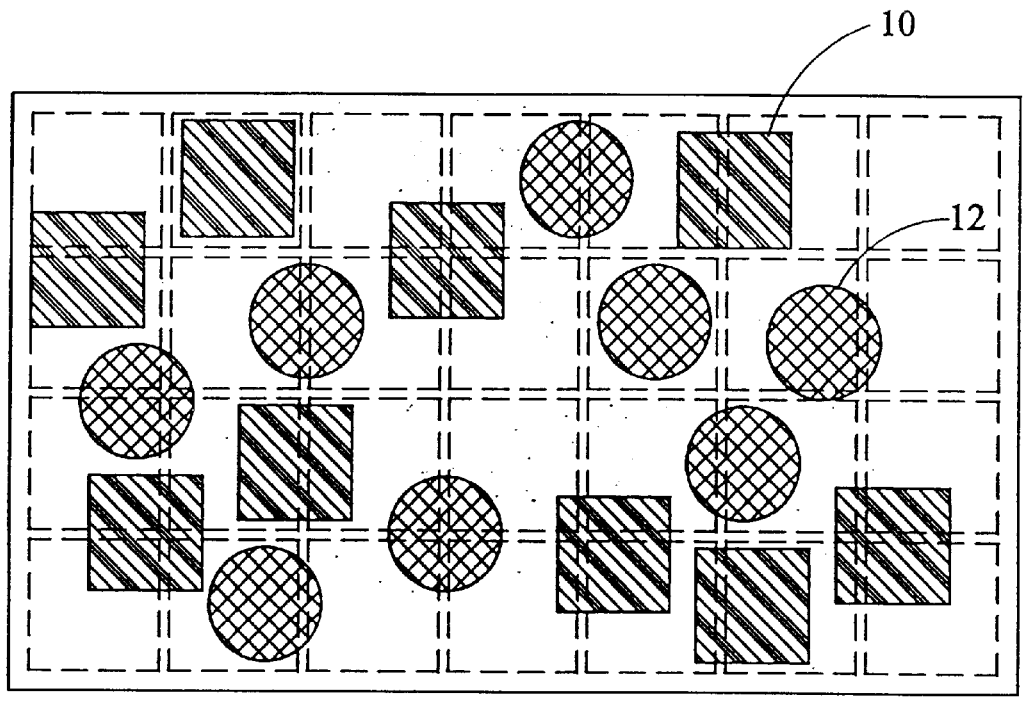
FIG. 4 is an image for characterization with four square and four circular features.
Figure 5:
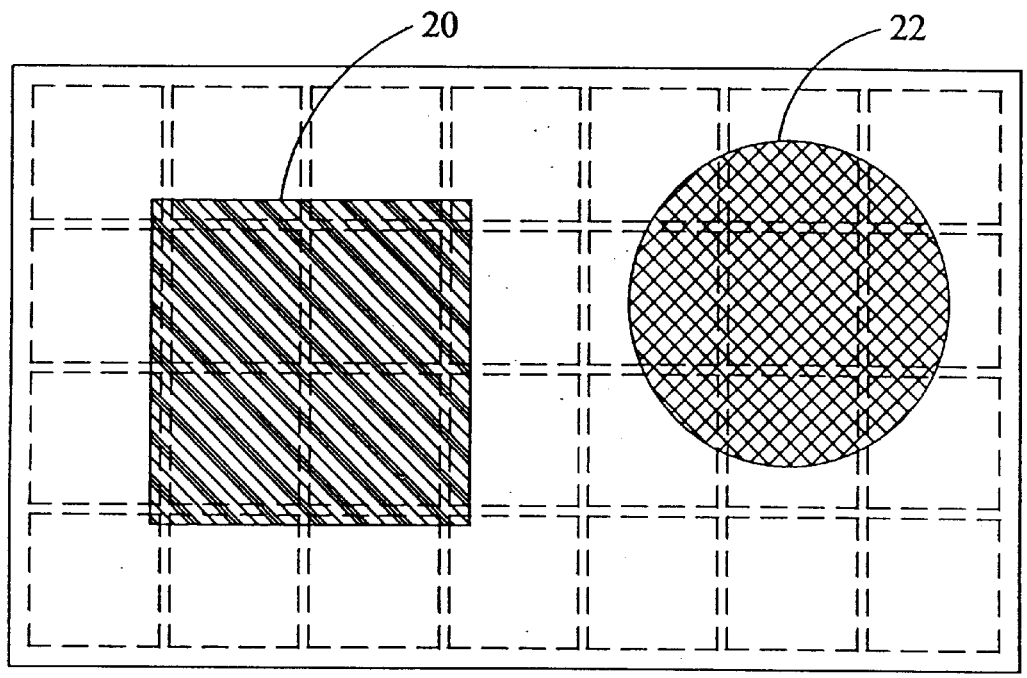
FIG. 5 is an image for characterization with a single square feature and a single circular feature where each feature has an area equal to the four features of the same geometric shape in FIG. 4.

Likewise if the sizes of the individual color regions of two images differ, the number of test areas of each color will likely vary. For example, the total areas of the four square 10 and circular 12 features of the image of FIG. 4 are equal to those of the square 20 and circular 22 features of the image of FIG. 5. As a result, the distribution of the population of picture elements as a function of color would be identical for the two images. However, as a result of the differences in sizes of the individual color regions of the images the number of test areas of each homogeneous color varies when the scale of the test area is held constant. In FIG. 5 there are more test areas that are the color of the circular feature than the test areas of FIG. 4 that lie wholly within the circular features. An image containing large uniform color regions or "blobs" will produce more test areas with the homogeneous color of those blobs than an image with smaller more scattered regions of color.

While some test areas may lie completely within a region of homogeneous color, several of the test areas of FIG. 2 overlap two or more color regions. As a result the colors in these test areas are not homogeneous and must be quantified in some way to be useful in describing the image. For example, the mean values of the individual red, green, and blue (RGB) pixels, a transform of the RGB pixel values or the mean color or the vector sum of the RGB intensity values might be used to describe the color of a test area of heterogeneous color. Since each test area having a heterogeneous color is likely to overlap two or more color regions to a degree differing from that of any other test area, there are likely to be as many mean colors or combinations of pixel intensities as there are test areas of heterogeneous color. Mapping the possible input values into a smaller number of quantized levels may be used to reduce the number of colors. For example, the RGB color data might be represented as the population of test areas in which percentage contributions of the red, green, and blue colors lie within certain ranges.

Figure 3:
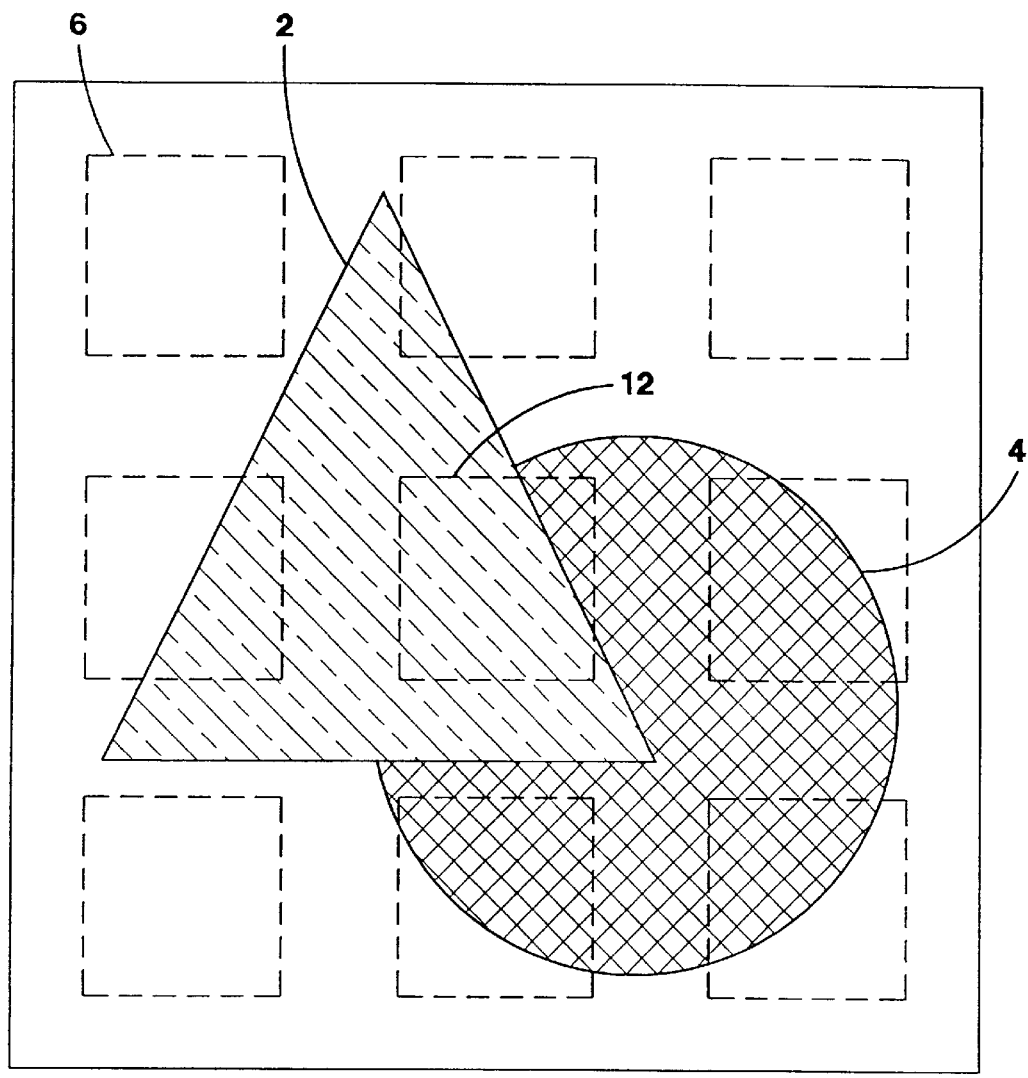
FIG. 3 illustrates the image of FIG. 2 with test areas of larger scale delineated on the image.

As can be seen in FIGS. 2 and 3, only a small number of test areas may fall completely within the bounds of an image feature and, therefore, have truly homogenous color. However, in several cases (see FIG. 2) a substantial part (less than all) of a test area is a particular color. The number of test areas included in the set of areas with homogeneous color can be increased by including in the application a test of homogeneity that would include in the data areas of "substantial" homogeneity. Likewise, accepting regions of images which are substantially homogeneous may be necessary for images which do not include many homogeneous color regions.

For example, a test of homogeneity can be based on the standard deviation of colors of the picture elements in the test area. If $\sigma_k$ is the standard deviation of the pixel values in color channel k within a test area $\epsilon$ then homogeneity can be defined by:

$$H(\epsilon) = 1 - \sum_k w_k \sigma_k$$

where $w_k$ is the weight coefficient for color channel k.

An alternative homogeneity test function can be based on principle component analysis. A matrix A is defined as $A=(p_{ij})_{M\times N}$ where $p_{ij}$ is the jth color component of the ith pixel within a test area $\epsilon$. The singular values of A are determined by singular value decomposition. Letting $\rho_k$, where k=1,2, . . . , denote the singular values of A in descending order of magnitude, then homogeneity can be defined as:

$$H(\epsilon) = 1 - \sum_{k>1} w_k \rho_k / \rho_l$$

where $w_k$ is the weight coefficient corresponding to singular value $\rho_k$, k>1.

Data produced by the application of the present method of image characterization can be incorporated into statistical representations which are familiar in the field. A "color blob" histogram can be constructed to present the frequency distribution of the population of test areas as a function of their color. For a given image I, a color blob histogram is the population distribution of all test areas of scale s, where s is the size of the test area in picture elements. The color blob histogram is defined as an array $h_s$ that has an element $h_{s,c}$ for each quantified color c belonging to the set C, that is c$\epsilon$C, and:

$$h_{s,c}=|\{\epsilon \subset I_s| c(\epsilon)=c\}|,$$

where C is the set of all quantified colors and $I_s$ is the set of all color blobs of size s in the image I.

The population distribution of test areas as a function of color can also be described by color blob moments which are the statistical moments of the color blob histogram. The present method has provides the advantage that color blob moments are extremely compact image descriptors. For a given image I, the first, second, and third statistical moments of the population distribution of the test areas of size s in each color channel k are:

the mean ($\mu$) (first moment):

$$\mu_{s,k} = \frac{1}{|I_s|}\sum_{\epsilon \in I_s} c_k(\epsilon)$$

the standard deviation ($\sigma$) (second moment):

$$\sigma_{s,k} = \frac{1}{|I_s|}\sum_{\epsilon \in I_s} (c_k(\epsilon) - \mu_{s,k})^2)^{1/2}$$

the skew ($\lambda$) (third moment):

$$\lambda_{s,k} = \frac{1}{|I_s|}\sum_{\epsilon \in I_s} (c_k(\epsilon) - \mu_{s,k})^3)^{1/3}$$

where: $c_k(\epsilon)$ is the kth color component of $c(\epsilon)$.

Referring to FIG. 7, the data resulting from a processed image may be represented as a set of quantized colors, $\mu_0$–$\mu_{10}$, together with an indication of the number of test areas having a sufficiently homogeneous color matching one of the quantized colors. In other words, if $\mu_5$ is red and six test areas are sufficiently homogeneously red then $\mu_5$ would have a total of six. The result is a histogram where each of the entries totals the number of test areas having sufficiently homogeneous colors, as opposed to the summation of the colors of the individual pixels. The image may be processed with different test area sizes, s, to provide additional data. The resulting data from many images may be used for image comparison purposes.

Figure 6A:
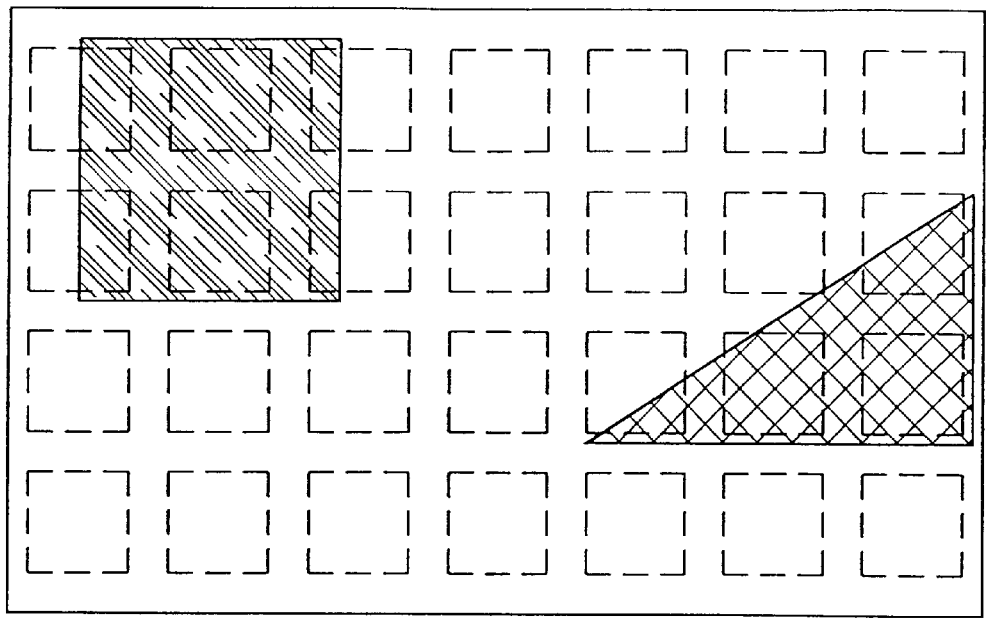
FIGS. 6A and 6B illustrate two similar images having features of the same size and shape but which have been translated and rotated.
Figure 6B:
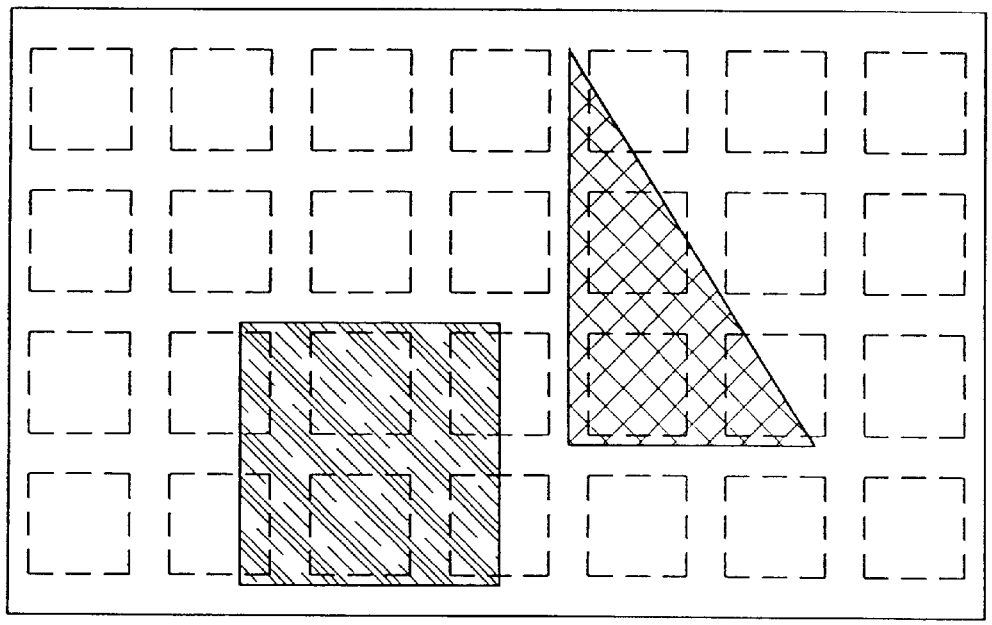

A second desirable attribute of the present method of image characterization is the invariance of the descriptors to rotation or translation of image features. In the two images in FIG. 6 the square feature is translated vertically and horizontally while the triangular feature is rotated ninety degrees. The number of test areas having the homogeneous color of each of these features is unchanged. It can be shown for isotropic color areas that the color blob histograms and color blob moments are invariant to translation or rotation of image features.

The method of image characterization of the present invention is equally advantageous in characterizing images on the basis of their texture or surface appearance. While color is a point property and can be described by color histograms or other representations of the color properties of picture elements, texture is a local neighborhood property and texture descriptors describe the properties of an area surrounding a picture element. In applying the present method of image characterization, the texture of the individual test areas can be expressed in terms of mean texture descriptors, such as anisotropy, orientation, and contrast. The texture descriptors can be statistically described by a texture blob histogram. For an image I, a texture blob histogram for test areas containing s picture elements is the population distribution of test areas of size s, defined as an array $h_s$ that has an element $h_{s,t}$ for each quantized texture model t contained in T and $$h_{s,t}=|\{\epsilon \subset I_s|t(\epsilon)=t\}|$$

where T is the set containing all quantized texture models.

For a given image I, the texture blob moments for test areas of scale s are the first, second, and third statistical moments of the frequency distribution of the test areas of size s in each texture band k, that is:

the mean ($\mu$) (first moment):

$$\mu_{sk} = \frac{1}{|I_s|} \sum_{\epsilon \in I_s} t_k(\epsilon)$$

the standard deviation ($\sigma$) (second moment):

$$\sigma_{sk} = \left( \frac{1}{|I_s|} \sum_{\epsilon \in I_s} (t_k(\epsilon) - \mu_{sk})^2 \right)^{1/2}$$

the skew ($\lambda$) (third moment):

$$\lambda_{sk} = \left( \frac{1}{|I_s|} \sum_{\epsilon \in I_s} (t_k(\epsilon) - \mu_{sk})^3 \right)^{1/3}$$

where $t_k(\epsilon)$ is the kth component of $t(\epsilon)$.

The aforementioned technique counts the total number of test areas that are sufficiently homogeneous based upon the standard deviation of the color or texture. Unfortunately, selection of the threshold value for the standard deviation is difficult. If the threshold value is zero then no test area will likely be sufficiently homogeneous. Alternatively, if the threshold value is large then many of the test areas will likely be not very homogeneous, yet still be counted. Referring to FIG. 8 an additional aspect of the present invention includes determining the percentage color distribution for the quantized colors for each test area. The resulting matrix has the number of occurrences of each quantized color as a function of color percentage. It is noted that the 100 percent column in FIG. 8 is the same as a single column of the aforementioned technique shown in FIG. 7.

Referring again to FIGS. 2–5, the description of the technique is illustrated for matters of convenience as a set of test areas spaced apart from one another. To increase the invariance to translation and rotation the preferred technique involves locating the test area at each pixel within the image.

The size of the test area can have a profound effect on the number of sufficiently homogeneous test areas. Referring to FIGS. 4 and 5, if the test area used was selected to be larger than the square and circular features 10 and 12 (FIG. 4) but less than the square and circular features 20 and 22 (FIG. 5), then processing FIG. 4 may result in no sufficiently homogeneous regions. However, processing FIG. 5 would result in several sufficiently homogeneous regions. In this manner the differences in the number of sufficiently homogenous test regions would be increased which would allow for easier differentiation between images using such measures.

The technique described herein is applicable to any suitable color space, such as Y/Cb/Cr. The pattern and size of the test areas on the images may be changed or be random, if desired.

The aforementioned homogeneity test provides a result that is either sufficiently homogenous (yes or "1") or not sufficiently homogenous (no or "0"), in a manner similar to a step function. The present inventors came to the realization that such a homogeneity test is sensitive to noise because slight variations in the standard deviation, which is a calculated quantity, may change the result of the homogeneity test if the standard deviation is close to the threshold.

Figures 9, 10:
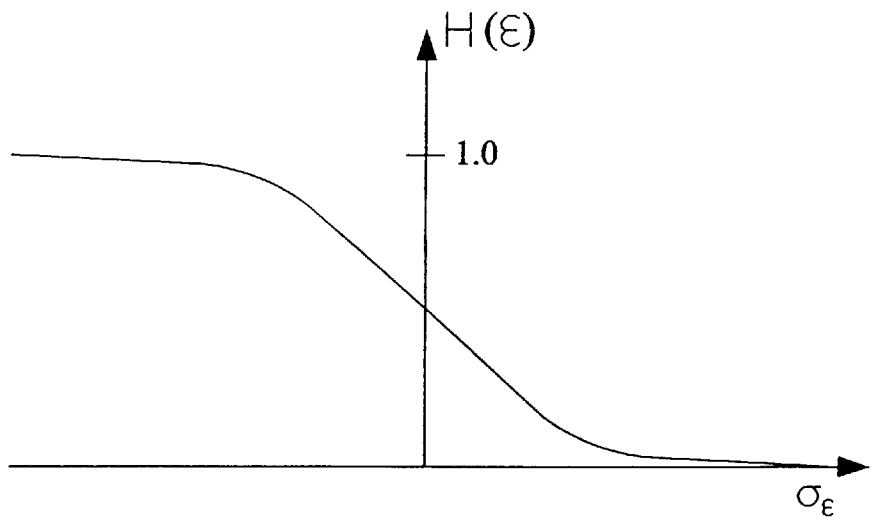
FIG. 9 is a graph of a nonbinary thresholding technique.
FIG. 10 is an exemplary illustration of the resulting image data for a third aspect of the present invention.

Accordingly, the aforementioned homogeneity test is sensitive to noise and doesn't take into account finer gradations in the amount of homogeneity. Referring to FIG. 9, the homogeneity threshold determination includes a "soft" thresholding mechanism. The thresholding mechanism provides a floating point measure (e.g., not a binary yes/no determination) of the homogeneity in reference to some measure of the homogeneity, such as the standard deviation. The preferred thresholding mechanism provides a gradual increase in the homogeneity as the standard deviation decreases. In this manner small changes in the standard deviation, in a region proximate the threshold, will not result in significant changes in the measure of the homogeneity. In addition, the particular selection of the threshold value is less critical to achieving accurate results. Other non-binary functional definitions of the homogeneity as a function of some measuring criteria may likewise be used, if desired.

Referring again to FIG. 8, the percentage color distribution for the quantized colors for each test area is illustrated based on an equal percentage distribution for each column. However, the present inventors tested a large number of actual images and determined that most images contain a large variety of color content in most regions of the image. Accordingly, the color distributions for most images tend to be distributed toward the smaller percentages. In other words, typical images contain relatively few large regions of substantially pure homogenous color. With relatively few significant regions of homogenous color, the portions of the matrix with larger percentage values tend to be primarily zero which wastes space and does not provide an effective technique of discriminating between real world images that contain smaller differences. Referring to FIG. 10, to overcome these limitations and to maintain a relatively compact matrix, the present inventors determined that the matrix should include smaller percentage ranges at the smaller percentages, with increasing percentage ranges toward the larger percentages. This maintains a small matrix, which is suitable for embedded systems, while providing more accurate discrimination between images with similar color content.

It is to be understood that the aforementioned description regarding a "soft" thresholding technique and modified matrix is likewise applicable for texture.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method for characterizing an image comprising the steps of:

(a) delineating on said image a plurality of test areas;

(b) quantifying the color of each of said test areas; and (c) tabulating said quantifying of said color as a plurality of different colors and a plurality of different ranges representative of a percentage of the respective said color for the respective said test area for each of said different colors.

2. The method of claim 1 further comprising the steps of:

(a) defining a spatial structural element including a plurality of picture elements; and (b) said quantifying said test areas corresponding to said spatial structural element.

3. The method of claim 1 wherein the color of each of said test areas is quantified as at least one of the mean color and the representative color.

4. The method of claim 1 wherein the color of each of said test areas is quantified as the mean of each of the red, green, and blue color intensities.

5. The method of claim 1 wherein said plurality of different ranges are non-uniform.

6. The method of claim 1 wherein said quantifying said color of each of said test area is based on a non-binary homogeneity measure.

7. A method for characterizing an image comprising the steps of:

(a) delineating on said image a plurality of test areas;

(b) testing the homgeneity of the color of each of said test areas on said image; and (c) quantifying the color of each of said test areas using, at least in part, a non-binary homogeneity measure and a plurality of different ranges of colors.

8. The method of claim 7 further comprising the step of characterizing said image by the distribution of the population of said test areas as a function of color.

* * * * *

UNITED STATES PATENT AND TRADEMARK OFFICE
CERTIFICATE OF CORRECTION

PATENT NO. : 6,542,632 B1
DATED : April 1, 2003
INVENTOR(S) : Richard J. Qian et al.

It is certified that error appears in the above-identified patent and that said Letters Patent is hereby corrected as shown below:

Column 1,
Line 48, replace "thefeatures" with -- the features --.

Column 5,
Line 67, please delete the word "has".

Column 10,
Line 2, replace "homgeneity" with -- homogeneity --.

Signed and Sealed this

Twenty-eighth Day of October, 2003

JAMES E. ROGAN
*Director of the United States Patent and Trademark Office*